US011216316B1

(12) United States Patent
Sproat et al.

(10) Patent No.: US 11,216,316 B1
(45) Date of Patent: Jan. 4, 2022

(54) FACILITATING OBJECT DELETION BASED ON DELETE LOCK CONTENTION IN DISTRIBUTED FILE SYSTEMS

(71) Applicant: EMC IP Holding Company LLC, Hopkinton, MA (US)

(72) Inventors: Lisa Sproat, Seattle, WA (US); Ron Steinke, Tacoma, WA (US); Douglas Kilpatrick, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/939,872

(22) Filed: Jul. 27, 2020

(51) Int. Cl.
*G06F 9/52* (2006.01)
*G06F 16/182* (2019.01)
*G06F 12/0891* (2016.01)

(52) U.S. Cl.
CPC .......... *G06F 9/52* (2013.01); *G06F 12/0891* (2013.01); *G06F 16/182* (2019.01); *G06F 2212/1044* (2013.01)

(58) Field of Classification Search
CPC ....................................................... G06F 9/52
USPC ....................................................... 711/141
See application file for complete search history.

(56) References Cited

U.S. PATENT DOCUMENTS

| 6,944,615 | B2 * | 9/2005 | Teng | G06F 16/2343 |
| 2002/0188605 | A1 * | 12/2002 | Adya | H04L 63/123 |
| 2004/0068563 | A1 * | 4/2004 | Ahuja | H04L 67/1002 |
| | | | | 709/225 |
| 2006/0230411 | A1 * | 10/2006 | Richter | G06F 9/526 |
| | | | | 719/328 |
| 2008/0168458 | A1 * | 7/2008 | Fachan | G06F 9/526 |
| | | | | 718/104 |
| 2008/0177955 | A1 * | 7/2008 | Su | G06F 12/0811 |
| | | | | 711/154 |
| 2008/0209433 | A1 * | 8/2008 | McKenney | G06F 9/52 |
| | | | | 718/104 |
| 2009/0210880 | A1 * | 8/2009 | Fachan | G06F 9/526 |
| | | | | 718/104 |
| 2010/0241774 | A1 * | 9/2010 | Olszewski | G06F 9/52 |
| | | | | 710/200 |
| 2010/0275209 | A1 * | 10/2010 | Detlefs | G06F 9/526 |
| | | | | 718/102 |
| 2017/0031730 | A1 * | 2/2017 | Greco | G06F 9/5005 |

* cited by examiner

*Primary Examiner* — Titus Wong
(74) *Attorney, Agent, or Firm* — Amin, Turocy & Watson, LLP

(57) ABSTRACT

Facilitating object deletion based on delete lock contention in distributed file systems is provided herein. A first node device of a cluster of node devices. The first node device can comprise a processor and a memory that stores executable instructions that, when executed by the processor, facilitate performance of operations. The operations can comprise determining whether a contention callback is assigned to an object scheduled to be removed from cache of the first node device. The operations also can comprise, based on the contention callback being assigned to the object, granting a write lock to a second node device of the cluster of node devices and removing from the cache a link to the object. Further, the operations can comprise, based on the contention callback not being assigned to the object, releasing from the cache the link to the object without interactions with other node devices of the cluster of node devices, the other node devices including the second node device and being other than the first node device.

20 Claims, 10 Drawing Sheets

US 11,216,316 B1

FACILITATING OBJECT DELETION BASED ON DELETE LOCK CONTENTION IN DISTRIBUTED FILE SYSTEMS

TECHNICAL FIELD

The subject disclosure relates generally to distributed file systems. More specifically, the subject disclosure relates to managing lock resources in distributed file systems.

BACKGROUND

Distributed storage systems and/or object storage systems can provide a wide range of storage services while achieving high scalability, availability, and serviceability. Operations of distributed storage systems and/or object storage systems can include a locking mechanism to maintain data consistency of the associated shared files. For example, shared and exclusive acquisition of a lock, where there can be multiple shared owners simultaneously, can be utilized as a pattern for the locking mechanism. However, this pattern can be costly for a distributed system with thousands of shared lockers, as a single thread taking an exclusive lock anywhere in the system can bring all shared lock requests to a halt until all existing shared owners release their locks.

The above-described context with respect to conventional storage systems is merely intended to provide an overview of current technology and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, provided herein is a first node device of a cluster of node devices. The first node device can comprise a processor and a memory that stores executable instructions that, when executed by the processor, facilitate performance of operations. The operations can comprise determining whether a contention callback is assigned to an object scheduled to be removed from cache of the first node device. The operations also can comprise, based on the contention callback being assigned to the object, granting a write lock to a second node device of the cluster of node devices and removing from the cache a link to the object. Further, the operations can comprise, based on the contention callback not being assigned to the object, releasing from the cache the link to the object without interactions with other node devices of the cluster of node devices, the other node devices including the second node device and being other than the first node device.

In some implementations, determining whether the contention callback is assigned to the object can comprise determining whether a flag in a data structure definition of the object is in a first state that indicates the contention callback is assigned to the object, or in a second state that indicates the contention callback is not assigned to the object.

The contention callback can indicate that at least the second node device attempted to upgrade to an exclusive delete lock while the first node device held a shared lock for the object. The object can be a file stored on a distributed file system. Further, the cluster of node devices are nodes of a distributed file system.

According to some implementations, the operations can comprise, prior to determining whether the contention callback is assigned to the object, identifying the object for removal from the cache. Identifying the object can comprise determining access to the object has not occurred within a defined time period.

The operations can comprise, according to some implementations and prior to determining whether the contention callback is assigned to the object, identifying the object for removal from the cache. Identifying the object can comprise receiving an implicit command to delete the object.

Another embodiment relates to a method that can comprise determining, by a first node device comprising a processor and part of a group of node devices, that an object is to be unlinked at the first node device. The method also can comprise performing, by the first node device, an operation from a group of operations. The group of operations can comprise, based on a status of an indicator associated with the object being in a first state, performing, by the first node device, a first operation of the group of operations that grants a write lock to a second node device of the group of node devices and removes, from a cache of the first node device, a link to the object. The group of operations also can comprise, based on the status of the indicator being in a second state, performing, by the first node device, a second operation of the group of operations that removes the link to the object from the cache of the first node device. Other nodes of the group of node devices, other than the first node device, are not notified of the second operation.

In an example, determining that the object is to be unlinked can comprise receiving a command to delete the object. The indicator can be a flag associated with a data structure that defines the object. The data structure can be an index node definition. Further, the link to the object can be an object descriptor. The object can be a file stored on a distributed file system. In addition, the group of node devices can be nodes of a distributed file system.

According to some implementations, the indicator being in the first state is an indication that the second node device attempted to upgrade to an exclusive delete lock for the object while the first node device held a shared lock for the object. Further to these implementations, performing the first operation can comprise releasing the shared lock for the object. In some implementations, performing the first operation can comprise upgrading a lock state associated with the first node device for the object.

Another embodiment relates to a machine-readable storage medium, comprising executable instructions that, when executed by a processor, facilitate performance of operations. The operations can comprise determining that a cache is to be released from a first node device of a group of node devices, identifying an object for removal from the cache, and determining whether a contention callback is assigned to the object. The operations also can comprise, based on the contention callback being assigned to the object, granting a write lock to a second node device of the group of node devices and removing from the cache a link to the object.

Further, the operations can comprise, based on the contention callback not being assigned to the object, releasing from the cache the link to the object without interaction with other node devices of the group of node devices, other than the first node device and including the second node device.

In some implementations, determining whether the contention callback is assigned to the object can comprise determining whether a flag in a data structure definition of the object is in a first state that indicates the contention callback is assigned to the object, or in a second state that indicates the contention callback is not assigned to the object.

According to some implementations, identifying the object for removal from the cache can comprise determining access to the object has not occurred within a defined time period.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Example embodiments are directed to facilitating object deletion based on delete lock contention in distributed storage systems. Prior to a deletion of an object at a node device, which is holding a shared lock, an object description can be reviewed to determine if any other node devices are waiting for an exclusive delete lock for the object. If so, the node device can release its share lock and the exclusive delete lock can be provided to the other node device waiting for the exclusive delete lock. If no other node devices are waiting, the object can be deleted, or unlinked, at the node device. Further aspects and embodiments of this disclosure are described in further detail below.

One example computing platform that can optionally incorporate the object deletion techniques disclosed herein is an ISILON OneFS® cluster provided by DELL®, Inc. It can be appreciated that OneFS® clusters are one of many optional cluster computing technologies, any of which can incorporate the teachings of this disclosure.

Figure 1:
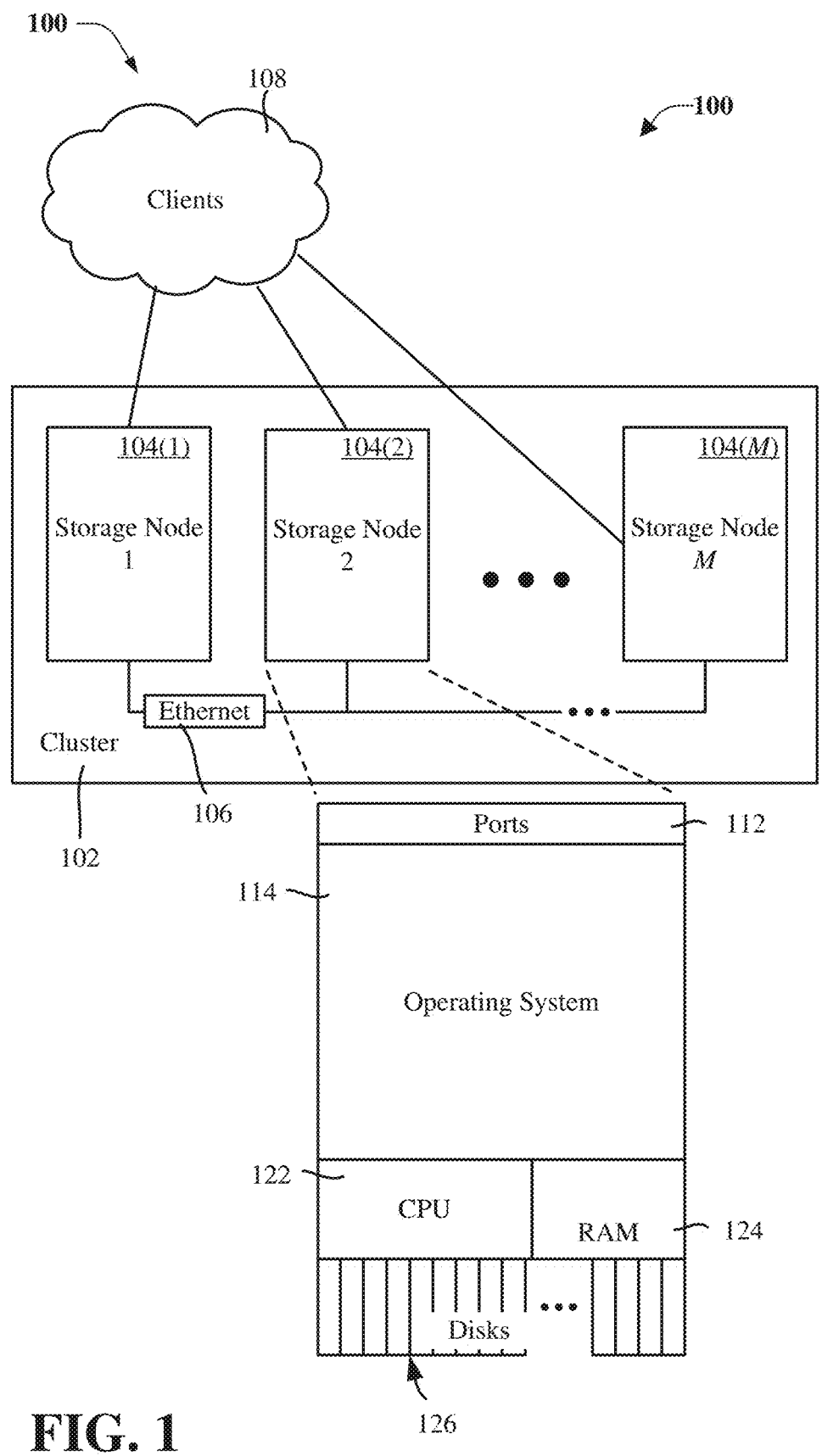
FIG. 1 illustrates an example cluster of computing devices, in accordance with one or more embodiments described herein.

FIG. 1 illustrates an example cluster of computing devices, in accordance with one or more embodiments described herein. FIG. 1 includes a cluster 102 of data node devices, referred to in FIG. 1 as storage nodes 104(1), 104(2) . . . 104(M), where M is a positive integer. Each storage node 104(1), 104(2) . . . 104(M) can comprise a computing device. Storage nodes 104(1), 104(2) . . . 104(M) can be configured to serve objects in response to requests from clients 108. Furthermore, typically one of the storage nodes 104(1), 104(2) . . . 104(M) can host a cluster controller virtual machine (not shown in FIG. 1), making that node the cluster controller node which administers the cluster 102. The storage nodes 104(1), 104(2) . . . 104(M) can be coupled to one other via a suitable data communications link comprising interfaces and protocols such as, but not limited to, Ethernet block 106.

Clients 108 can send data system-related requests to the cluster 102, which in general can be configured as one large object namespace. The cluster 102 can maintain an unlimited number of objects (e.g., up to trillions of objects or more). To this end, a node such as the node 104(2) generally comprises ports 112 by which clients 108 connect to the cluster 102. Example ports 112 are provided for requests via various protocols, including but not limited to SMB (Server Message Block), FTP (File Transfer Protocol), HTTP/HTTPS (Hypertext Transfer Protocol), and NFS (Network File System); further, SSH (Secure Shell) allows administration-related requests, for example.

Each node, such as the node 104(2), can include an instance of an operating system 114 (e.g., a OneFS® or other operating system). Each node, such as the node 104(2), can furthermore include a CPU 122, RAM 124, and storage devices such as disks 126. RAM 124 and disks 126 can comprise, for example, volatile memory, nonvolatile memory, hard disk drives, solid-state drives or other types of memory devices. Furthermore, RAM 124 and disks 126 at multiple of the storage nodes 104(1)-104(M), as well as other storage devices attached to the cluster 102, can be used to collectively support a logical disk which provides a shared storage location for the cluster 102.

It is noted that cluster deployments can be of any size. Depending on the needs of a particular organization, some clusters can comprise five or fewer nodes, while large clusters can comprise much larger numbers of nodes. The technologies disclosed herein can be included in clusters of any size.

In a non-limiting example, file references on the OneFS® distributed filesystem are represented by shared locks on a special lock domain, referred to as the "Delete Lock Domain." When a file is unlinked and no longer has a shared lock reference, a delete is attempted via, for example, a VOP_INACTION implementation. This routine attempts a nonblocking upgrade of the running node's shared lock reference to an exclusive lock on the delete domain. This upgrade attempt will fail if a shared lock reference is still held by another node.

The aspects described herein attempt to overcome the above noted challenges by flagging a file for deletion by using a contention callback on the delete lock domain, and selectively upgrading locks in VO_INACTIVE only when required. This can reduce or mitigate an amount of time spent requesting superfluous lock upgrades in accordance with an implementation of VOP-INACTIVE.

Further, OneFS® implements a two-tiered distributed locking system, referred to as "lk." The two-tiered distributed locking system means that locks for a resource are coordinated by a given node, referred to as a coordinator, which can be petitioned for locks by nodes, referred to as initiators, of behalf of threads on the initiator nodes. Thus, when a thread requires a lock to perform work on a resource, that request might need to not only go to it local initiator, but also be sent off-node to the cluster-wide coordinator for that resource before a lock can be granted and the thread can be unblocked.

On UNiX® systems, for example, an unlinked file is deleted when the last reference to the unlinked file is released. In another example, on FreeBSD®, this is represented by a reference count on the vnode. However, on distributed filesystems, a file can be open on multiple nodes, and a distributed mechanism is needed. On OneFS®, a "reference count" is kept by shared locks on a Delete (or Reference) Lock Domain. A shared lock is taken on a LIN by an initiator node when a file is first reference, and the shared lock is released when the last thread on that initiator node dereferences the file. As such, no more than one shared lock is held at a time by any initiator node. When an unlinked file no longer has shared lock references, an exclusive lock on the delete domain can be acquired. To that end, the disclosed aspects discussed herein attempt a nonblocking upgrade of the initiator's held shared delete lock to an exclusive delete lock. If the upgrade fails, it is expected that the other node holding a reference will perform the delete instead.

Delete locks are not merge-protected. Therefore, on a clustered filesystem, in order to provide consistent state, delete lock upgrades can only be performed under a cluster-exclusive LIN lock for the delete lock's referenced LIN. Taking a cluster-exclusive LIN lock for every attempt at freeing an in-memory inode is inefficient and results in unnecessary thrashing. To improve performance, in particular time to unmount IFS, the aspects disclosed herein provide a mechanism to upgrade locks with discretion, only doing so when it is necessary.

To overcome the above noted challenges, the various aspects discussed herein add a flag to the IFS inode definition. The flag denotes if the inode is marked for deletion, and a contention callback to the delete lock domain that can fire whenever another node attempts to upgrade to an exclusive delete lock while a shared lock is held. The contention callback can set the added flag on the referenced inode, to mark the node for future deletion. This flag can later be read in bam_inactive so that the lock upgrade can be performed conditionally, rather than every time bam_inactive runs (or executes). It is noted that since delete locks are not merge protected, the various aspects discussed herein can save at least two potential calls to the lk coordinator every time bam_inactive runs, since the LIN lock associated with the LIN referenced by the delete lock is also upgraded to exclusive in order to upgrade the delete lock. This also allows the opportunity to perform more operations under a comparatively weaker LIN lock (thereby saving time in acquiring those locks), since the flag makes it clear if an upgrade will be needed in the bam_inactive path. This can also cause changes to the delete lock domain interface to plumb the necessary data (e.g., the relevant inode struct) through to the contention callback.

Figure 2:
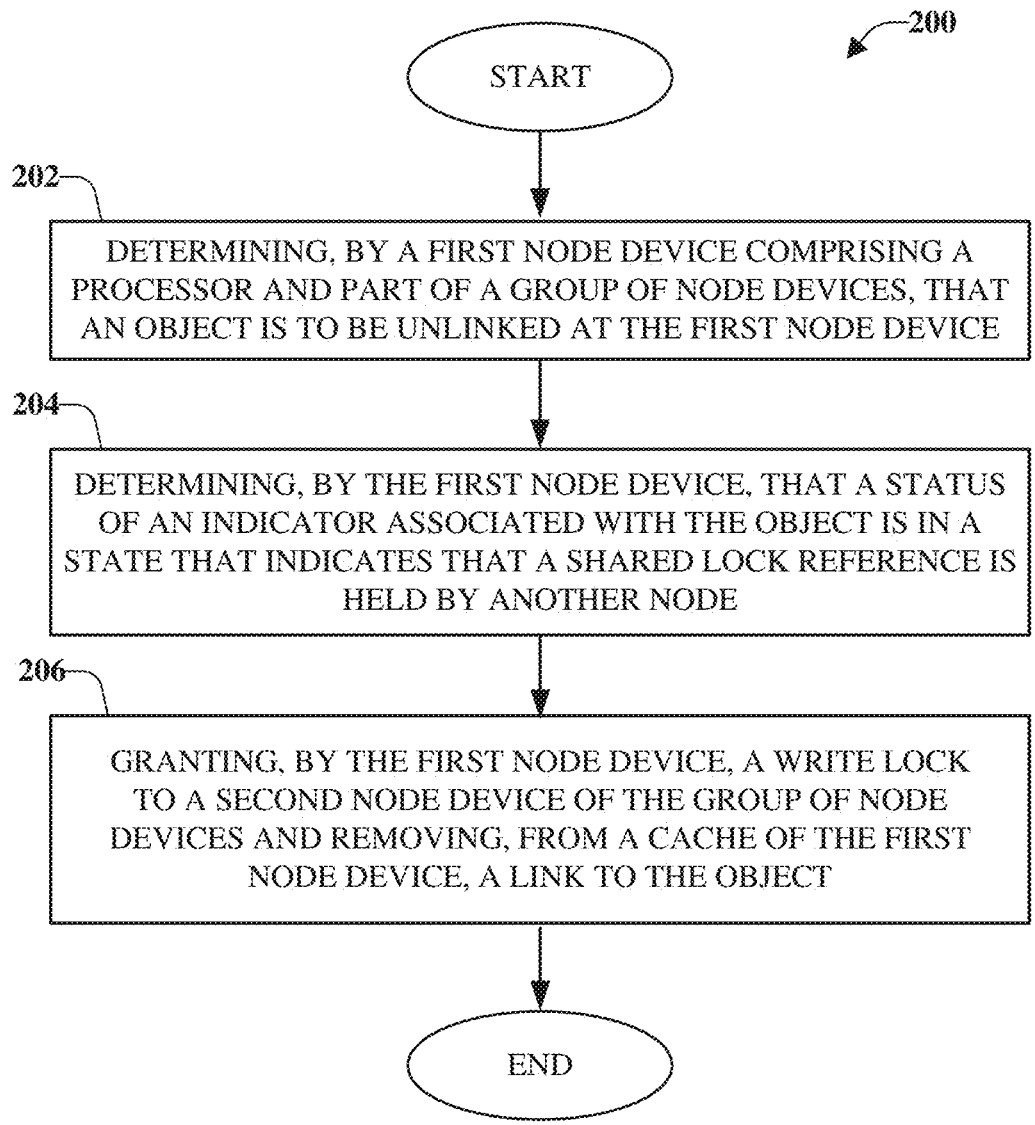
FIG. 2 illustrates a flow diagram of an example, non-limiting, computer-implemented method that unlinks an object based on another node device holding a shared lock reference for the object in accordance with one or more embodiments described herein.

In further detail, FIG. 2 illustrates a flow diagram of an example, non-limiting, computer-implemented method 200 that unlinks an object based on another node device holding a shared lock reference for the object in accordance with one or more embodiments described herein.

The computer-implemented method 200 starts, at 202 when a first node device determines that an object is to be unlinked at the first node device. A link (which is to be unlinked) can be an object descriptor. The object can be a file stored on a distributed file system. The first node device can comprise a processor and can be part of a group of node devices. For example, the group of node devices can be nodes of a distributed file system. To determine the object is to be unlinked, the first node device can receive an explicit request to remove the object, such as a delete request or another request that specifically identifies the object and that the object should be removed (e.g., deleted or unlinked). In another example, the request can be an implicit request, such as an inference that an object has not been accessed in a defined amount of time and removal of the object can free-up memory resources or other resources.

At 204, it can be determined that a status of an indicator associated with the object is in a state that indicates that a shared lock reference is held by another node device, such as a second node device. The indicator can be a flag associated with a data structure that defines the object. The data structure can be an index node definition. For example, the indicator could be in a first state or a second state. The first state can indicate that the shared lock reference is held by the second node device and the second state can indicate that the shared lock reference is not held by the second node device. In an example, the first state can be an active state and the second state can be an inactive state (or vice versa). In another example, the first state can be a binary state of "1" and the second state can be a binary state of "0" (or vice versa).

The other node device can be another node device of the group of node devices. Thus, the second node device attempted to upgrade to an exclusive delete lock while a shared lock was held by the first node device. Therefore, at 206, the first node device can cause the object to be unlinked at the first node device and the write lock granted to the second node device.

Figure 3:
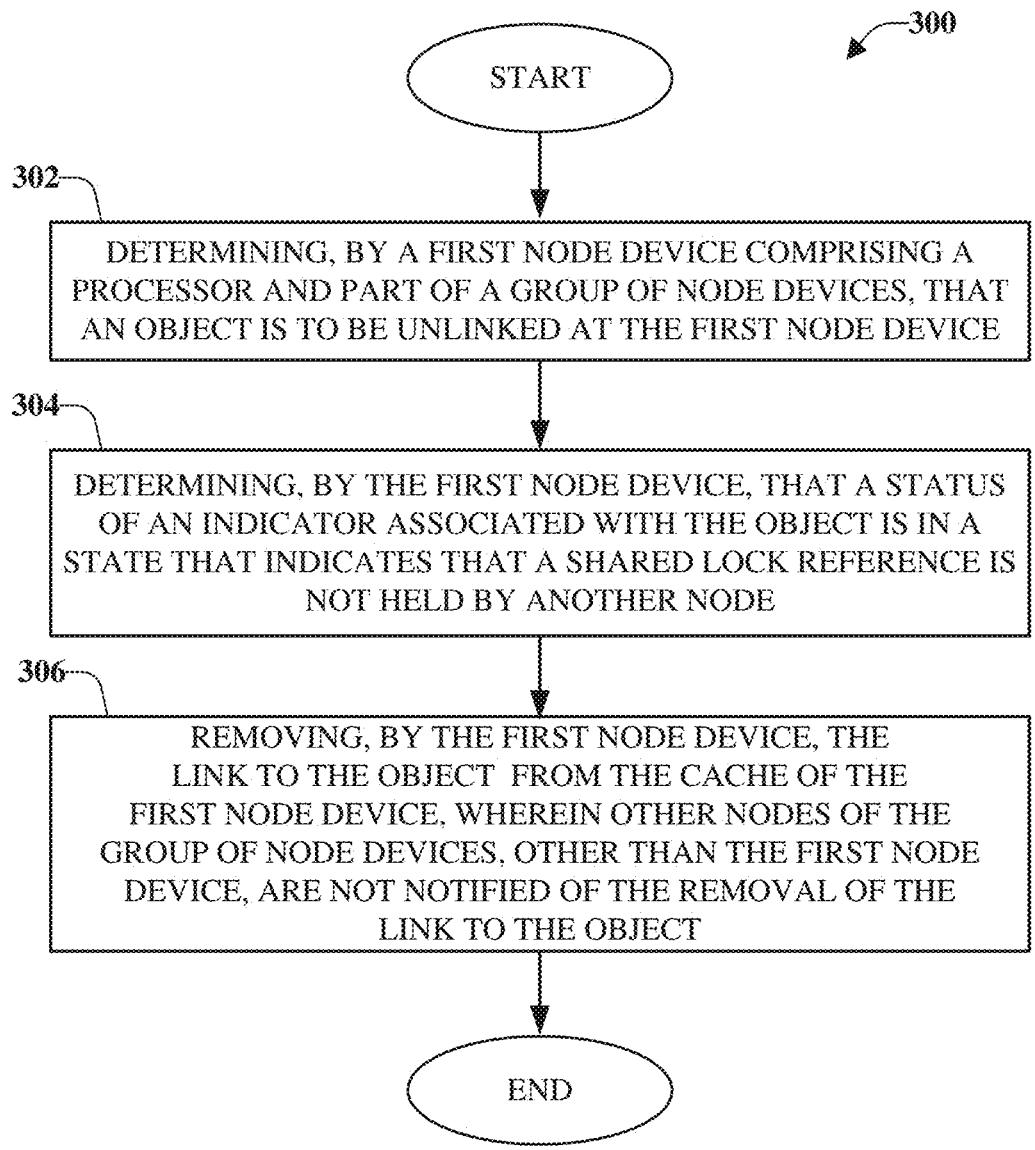
FIG. 3 illustrates a flow diagram of an example, non-limiting, computer-implemented method that unlinks an object based on no other node devices holding a shared lock reference for the object in accordance with one or more embodiments described herein.

FIG. 3 illustrates a flow diagram of an example, non-limiting, computer-implemented method 300 that unlinks an object based on no other node devices holding a shared lock reference for the object in accordance with one or more embodiments described herein.

The computer-implemented method 300 starts, at 302, when a first node device determines that an object is to be unlinked at the first node device. The link (which is to be unlinked) is an object descriptor. The object can be a file stored on a distributed file system. The first node device can comprise a processor and can be part of a group of node devices, which can be nodes of a distributed file system. To determine the object is to be unlinked, the first node device can receive an explicit request or an implicit request to remove the object. The explicit request can be a delete request, which can be received based on a determination that the object is no longer needed. In an example, the delete request can be received from an entity. As utilized herein an entity can be one or more computers, the Internet, one or more systems, one or more commercial enterprises, one or more computers, one or more computer programs, one or more machines, machinery, one or more users, one or more customers, one or more humans, and so forth, hereinafter referred to as an entity or entities depending on the context.

The implicit request can be based on rules and/or policies associated with objects. For example, the object can be marked for removal or deletion based on inactivity of the object at the first node device and based on a determination that the object can be retrieved from another source if the object is needed in the future. The determination of when to remove or unlink files can be based on various criteria including storage capabilities or other resource capabilities associated with the first node and/or other nodes of the group of nodes.

At 304, a determination can be made, by the first node, that a status of an indicator associated with the object is in a state that indicates that a shared lock reference is not held by another node (e.g., a second node of the group of nodes). Thus, no other node (e.g., the second node) has attempted to upgrade to an exclusive delete lock while a shared lock was held by the first node device. The indicator can be a flag associated with a data structure that defines the object. The data structure can be an index node definition.

For example, the indicator could be in a first state or a second state. The first state can indicate that the shared lock reference is not held by any other node devices in the group of node devices and the second state can indicate that a shared lock reference is held by at least a second node device of the group of node devices. In an example, the first state can be an active state and the second state can be an inactive state (or vice versa). In another example, the first state can be a binary state of "1" and the second state can be a binary state of "0" (or vice versa).

Accordingly, at 306, the first node device can remove the link to the object from the cache of the first node device. The link to the object can be removed without the first node device notifying other nodes in the group of nodes of the link removal. Thus, no other nodes are aware (nor need to be aware) that the first node device has removed the link to the object from its cache. This is in contrast to the computer-implemented method 200 of FIG. 2 where the second node was notified (e.g., the write lock being granted to the second node device).

Figure 4:
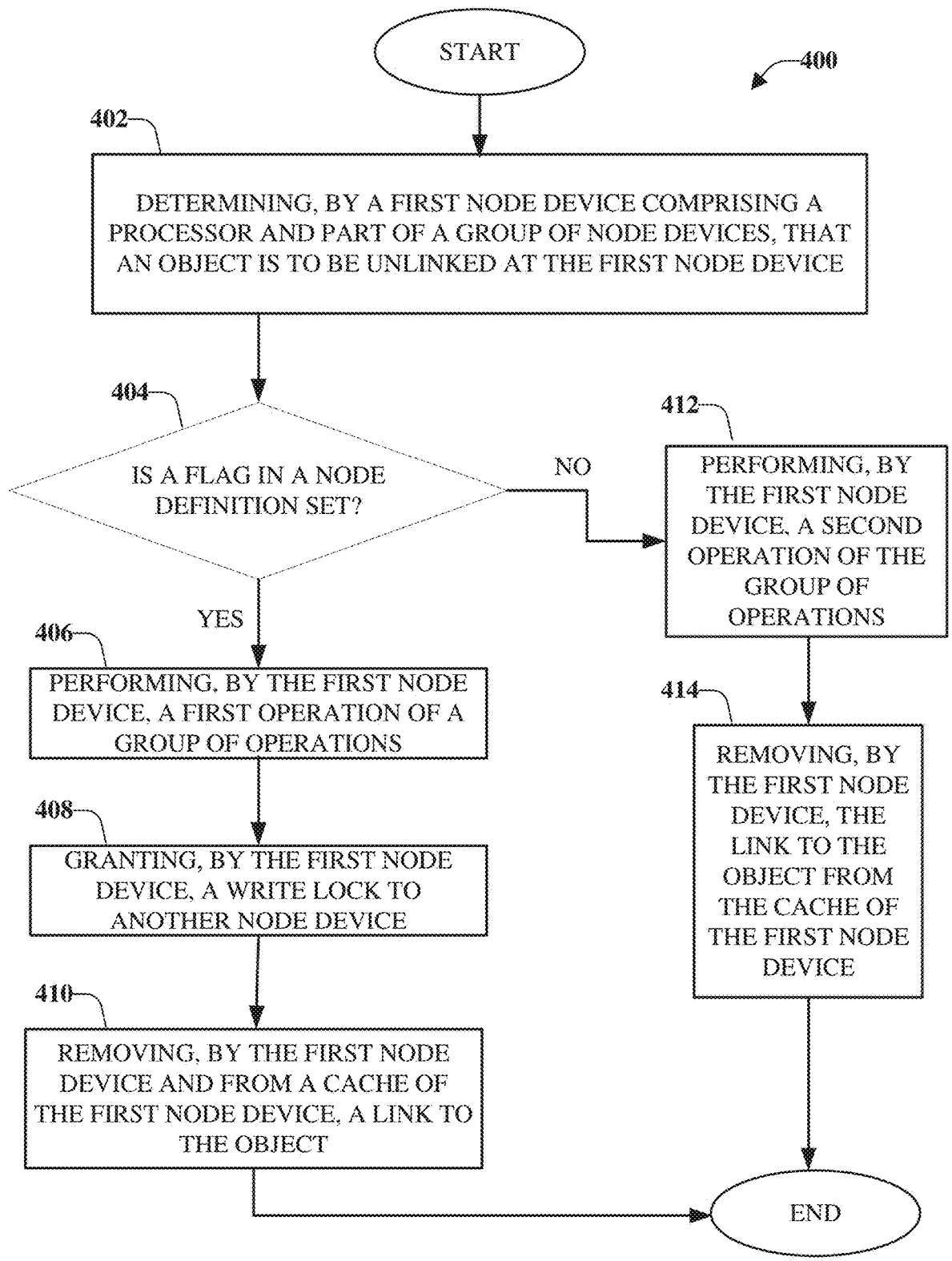
FIG. 4 illustrates an example, non-limiting, computer-implemented method that facilitates management of lock resources in distributed file systems in accordance with one or more embodiments described herein.

FIG. 4 illustrates an example, non-limiting, computer-implemented method 400 that facilitates management of lock resources in distributed file systems in accordance with one or more embodiments described herein.

The computer-implemented method 400 starts, at 402, when a first node device determines that an object is to be unlinked at the first node device. The object can be a file stored on a distributed file system. The first node device can comprise a processor (and a memory) and can be part of a group of node devices. For example, the group of node devices can be nodes of a distributed file system. The determination at 402 can be based on receipt of a command to delete the object. However, the disclosed aspects are not limited to this implementation and the determination can be based on other explicit and/or implicit information.

A determination can be made, at 404, whether a flag in a node definition is set. For example, the node definition can be set based on the flag being in an active state, set to "1," marked as "yes," and so on. Further to this example, the node definition is not set based on the flag being in an inactive state, set to "0," marked as "no," and so on. The flag can be set based on a node device of the group of node devices (other than the first node device) attempting to upgrade to an exclusive delete lock while a shared lock is held by the first node device. It is noted that the first node device can request an exclusive delete lock for another object and, thus, can cause a flag in a node definition set for the other object being set.

It is noted that various aspects are discussed herein with respect to the flag being set (active or "1") when another node device attempts to upgrade to an exclusive delete lock an the flag not being set (inactive or "0") if another node device has not attempted to upgrade to the exclusive delete lock, however, the disclosed aspects are not limited to this implementation. Instead, the flag can be set if no other node devices attempted to upgrade and the flag is not set if another node has attempted to upgrade.

If the determination at 404 is that the flag is set, the computer-implemented method 400 continues, at 406, and a first operation of a group of operations is performed. The first operation can include, at 408, granting, by the first node device, a write lock to another node device (e.g., a second node device) of the group of node devices. The second node device previously attempted to upgrade to an exclusive delete lock while the first node device held the shared lock. Further, at 410, the first node device can remove, from its cache, a link (e.g., an object descriptor) to the object. According to some implementations, performing the first operation can include releasing the shared lock for the object. In some implementations, performing the first operation can include upgrading a lock state associated with the first node device for the object.

Alternatively, if the determination at 404 is that the flag is not set, the computer-implemented method continues, at 412, and a second operation of the group of operations is performed. The second operation can include, at 414, removing the link to the object from the cache of the first node device. No other actions need to be performed. For example, other nodes of the group of nodes (other than the first node device) do not need to be notified of the second operation being performed.

Figure 5:
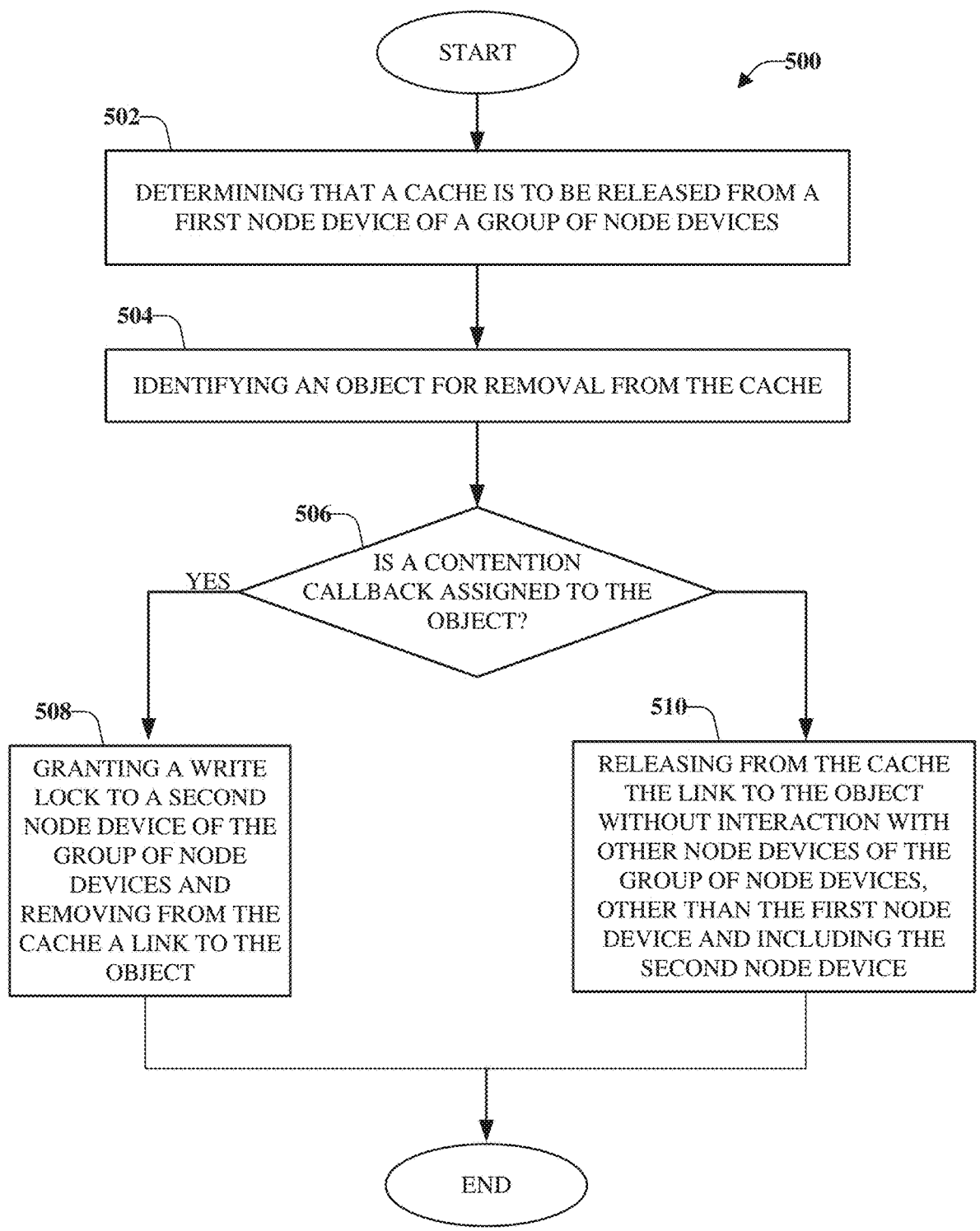
FIG. 5 illustrates an example, non-limiting, computer-implemented method that facilitates management of lock resources based on contention callback in accordance with one or more embodiments described herein.

FIG. 5 illustrates an example, non-limiting, computer-implemented method 500 that facilitates management of lock resources based on contention callback in accordance with one or more embodiments described herein.

At 502 of the computer-implemented method 500, a determination can be made that a cache is to be released from a first node device of a group of node devices. For example, it can be determined that cache is to be released based on an amount of cached being utilized is at or above a defined threshold level, based on expiration of one or more objects (e.g., the one or more objects have been retained in cached longer than a defined period), and so on.

At 504, the computer-implemented method 500 identifies an object for removal from the cache. For example, the object identified can be an object identified based on the amount of cache being utilized being above the defined threshold level and can be based on one or more other criteria (e.g., the object has not been accessed for longer than a defined access time, after which the object is considered to be stale, the object has been retained in cache longer than the defined period and has not been accessed during the defined period, and so on).

A determination is made, at 506, whether a contention callback is assigned to the object. The contention callback is on the delete lock domain and can be set whenever another node attempts to upgrade to an exclusive delete lock while a shared lock is held. The contention callback can set a flag on the referenced inode to mark the node for further deletion. The flag can be a new flag added in order to facilitate delete lock contention as discussed in this disclosure.

According to some implementations, the determination at 506 can include determining whether a flag in a data structure definition of the object is in a first state or a second state. The first state can indicate the contention callback is assigned to the object. The second state can indicate that the contention callback is not assigned to the object.

If the determination at 506 is that the contention callback is assigned to the object, at 508, a write lock can be granted to a second node device of the group of node devices and a link to the object can be removed from cache. Alternatively, if the determination at 506 is that a contention callback is not assigned to the object, at 510, the link to the object is released from the cache without interaction with other node devices of the group of node devices, other than the first node device and including the second node device.

Figure 6:
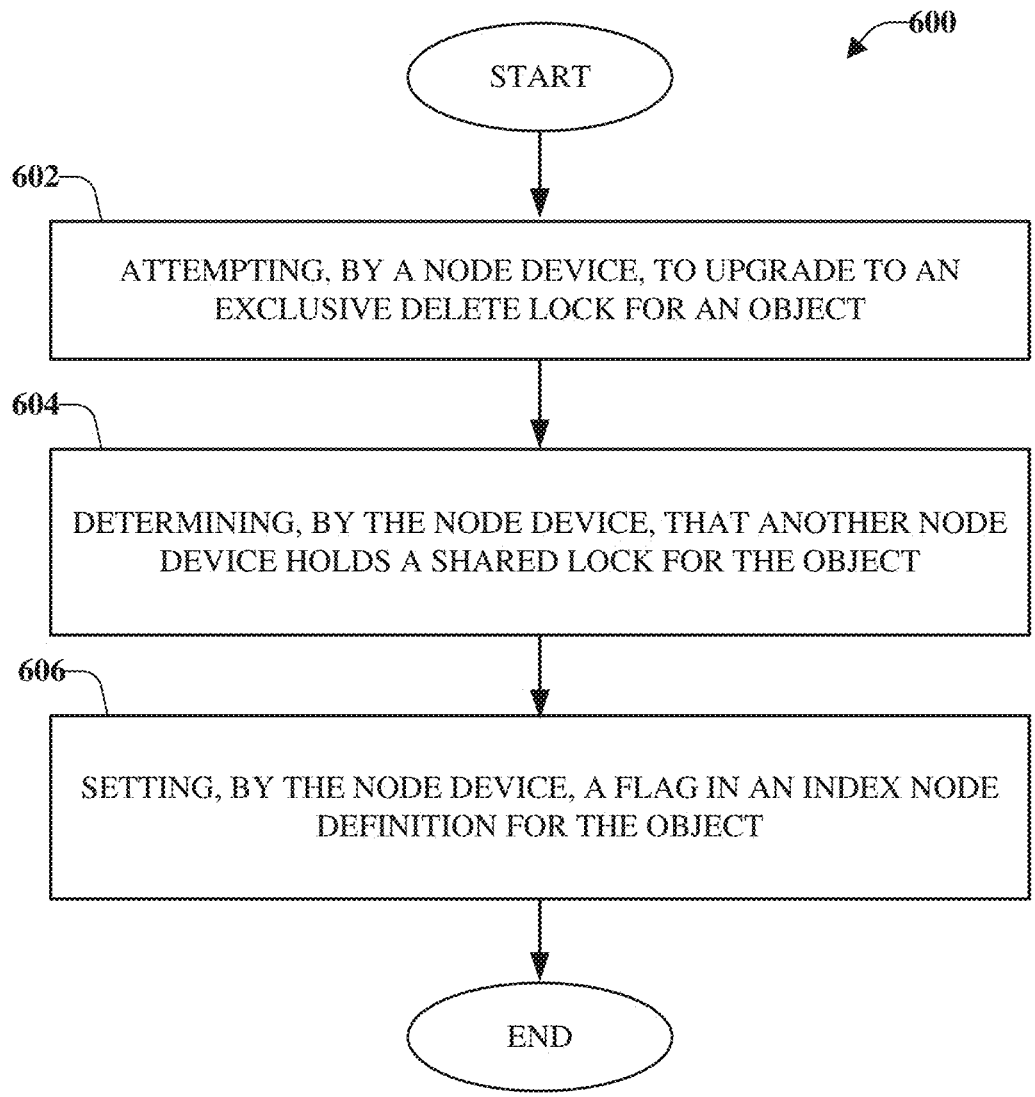
FIG. 6 illustrates an example, non-limiting, computer-implemented method that facilitates flagging an object for deletion by using a contention callback on a delete lock in accordance with one or more embodiments described herein.

FIG. 6 illustrates an example, non-limiting, computer-implemented method 600 that facilitates flagging an object for deletion by using a contention callback on a delete lock in accordance with one or more embodiments described herein.

The computer-implemented method 600 starts, at 602, when a node device attempts to upgrade to an exclusive delete lock for an object. For example, the node device (e.g., an initiator node) can petition a coordinator node for the exclusive delete lock.

At 604, a determination can be made that another node holds a shared lock for the object. Thus, at 606, a flag in an index node definition associated with the object can be set. The flag can be a new index or entry in the index node definition. The flag can denote that the object is marked for deletion and that a contention callback to the delete lock domain can be triggered when the other node (or more than one other node) attempts to upgrade to an exclusive delete lock when an shared lock is held by a different node. The contention callback sets the added flag and the node is marked for further deletion. The flag can be read later (e.g., in bam_inactive) so that the lock upgrade can be performed conditionally, instead of every time bam_inactive runs.

If there is no contention callback, no nodes are notified. Instead, the node device just removes (or unlinks) the objects and no other nodes know (or care as they were not waiting for a write lock). This can also mitigate or reduce the number of calls to a coordinator node every time bam_inactive runs.

Figure 7:
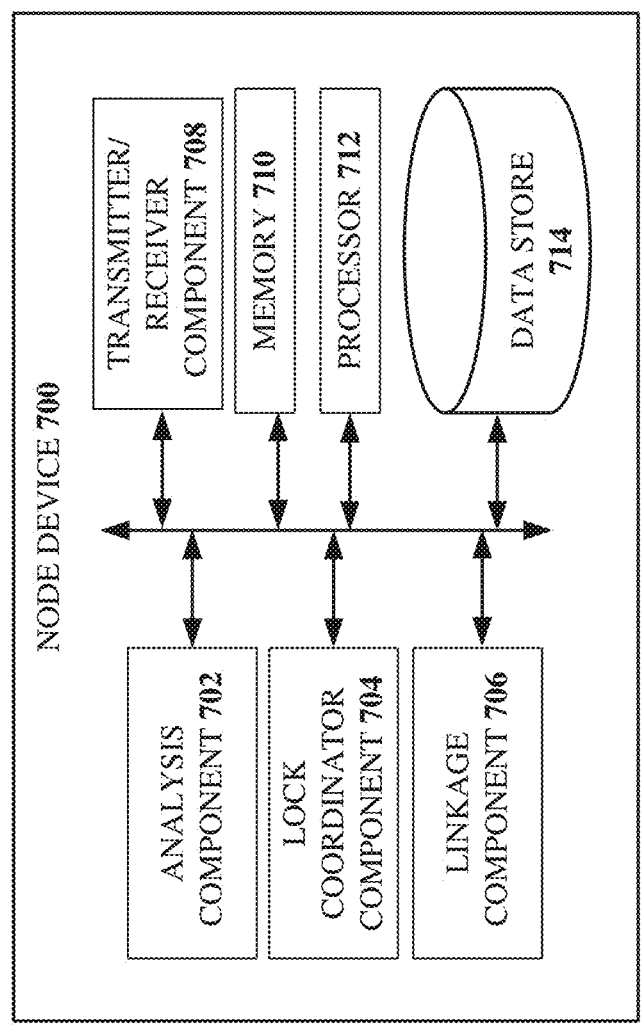
FIG. 7 illustrates an example, non-limiting, node device for managing lock resources in distributed file systems in accordance with one or more embodiments described herein.

FIG. 7 illustrates an example, non-limiting, node device 700 for managing lock resources in distributed file systems in accordance with one or more embodiments described herein. The node device 700 can comprise one or more of the components and/or functionality of the computing devices of FIG. 1 and/or the computer-implemented methods, and vice versa.

Aspects of devices (e.g., the node device 700 and the like), system, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the node device 700 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the node device 700 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The node device 700 can comprise an analysis component 702, a lock coordinator manager component 704, a linkage component 706, a transmitter/receiver component 708, at least one memory 710, at least one processor 712, and at least one data store 714. The analysis component 702 can determine whether a contention callback is assigned to an object scheduled to be removed from cache (e.g., the at least one memory 710, the at least one data store 714) of the node device 700. The object can be a file stored on a distributed file system or another type of computer readable data stored on the distributed file system. Various criteria can be utilized to determine whether the object is scheduled to be removed from cache including explicit and/or implicit determinations.

The contention callback can indicate that at least the second node device attempted to upgrade to an exclusive delete lock while the first node device held a shared lock for the object. To determine whether the contention callback is assigned to the object, the analysis component 702 can determine whether a flag in a data structure definition of the object is in a first state or a second state. The first state can indicate the contention callback is assigned to the object and the second state can indicate the contention callback is not assigned to the object.

Based on the analysis component 702 determining that the contention callback is assigned to the object, the lock coordinator manager component 704 can grant a write lock to another node device of the cluster of node devices. The other node device can be a node device that attempted to update to the exclusive delete lock. Further, the linkage component 706 can remove from the cache (e.g., the at least one memory 710) a link to the object.

Alternatively, based on the analysis component 702 determining that the contention callback is not assigned to the object, the linkage component 706 can release from the cache (e.g., the at least one memory 710, the at least one data store 714), the link to the object. In this case, there are no interactions with other nodes devices of the cluster of node devices.

The at least one memory 710 can be operatively connected to the at least one processor 712. The at least one memory 710 can store executable instructions and/or computer executable components (e.g., the analysis component 702, the lock coordinator manager component 704, the linkage component 706, the transmitter/receiver component 708, and so on) that, when executed by the at least one processor 712 can facilitate performance of operations (e.g., the operations discussed with respect to the various methods and/or systems discussed herein). Further, the at least one processor 712 can be utilized to execute computer executable components (e.g., the analysis component 702, the lock coordinator manager component 704, the linkage component 706, the transmitter/receiver component 708, and so on) stored in the at least one memory 710.

For example, the at least one memory 710 can store protocols associated with facilitating object deletion based on delete lock contention in distributed file systems as discussed herein. Further, the at least one memory 710 can facilitate action to control communication between the node device 700 and other node devices, one or more file storage systems, one or more devices, such that the node device 700 employ stored protocols and/or algorithms to achieve improved overall performance of distributed file systems as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 712 can facilitate respective analysis of information related to delete lock contention. The at least one processor 712 can be a processor dedicated to analyzing and/or generating information received, a processor that controls one or more components of the node device 700, and/or a processor that both analyzes and generates information received and controls one or more components of the node device 700.

The transmitter/receiver component 708 can output the write lock to the second node device or to another device or another node. The transmitter/receiver component 708 can be configured to transmit to, and/or receive data from, for example, log files, a defined entity, one or more other nodes, and/or other communication devices. Through the transmitter/receiver component 708, the node device 700 can concurrently transmit and receive data, can transmit and receive data at different times, or combinations thereof.

Figure 8:
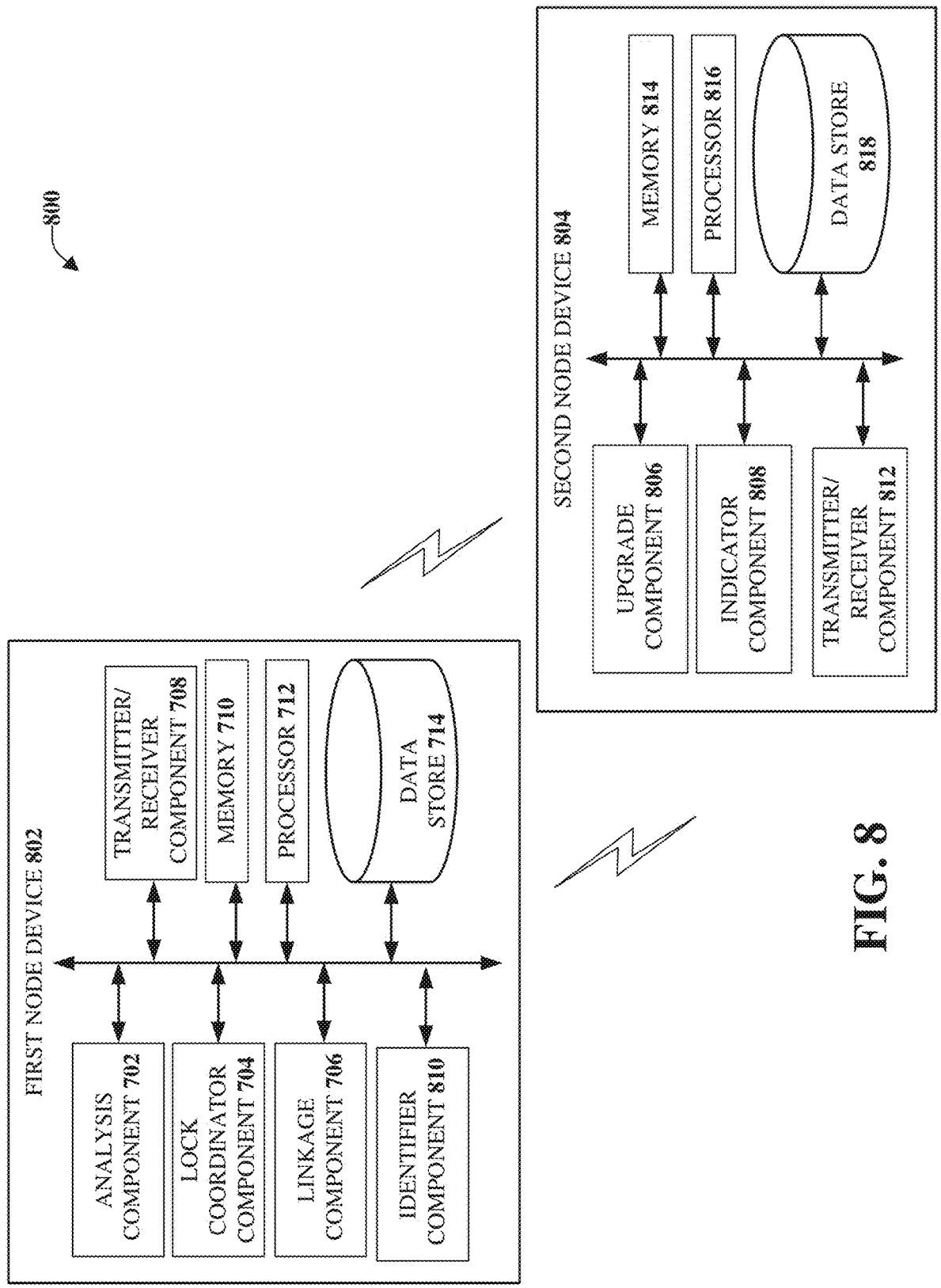
FIG. 8 illustrates an example, non-limiting, system for managing lock resources in distributed file systems in accordance with one or more embodiments described herein.

FIG. 8 illustrates an example, non-limiting, system 800 for managing lock resources in distributed file systems in accordance with one or more embodiments described herein. Repetitive description of like elements employed in other embodiments described herein is omitted for sake of brevity. The system 800 can comprise one or more of the components and/or functionality of the computing devices of FIG. 1, the computer-implemented methods, and/or the node device 700, and vice versa.

The system can comprise a first node device 802 (e.g., the node device) and at least a second node device 804. The first node device 802 and the second node device 804 can be included in a cluster of node devices that can also comprise other node devices (not shown).

The first node device 802 can hold at least one shared lock for at least one object. The second node device 804 can comprise an upgrade component 806 that can attempt to upgrade to an exclusive delete lock for the object. If the upgrade component 806 attempts the upgrade while the first node device 802 holds the shared lock for the object, a flag can be set (via an indicator component 808) in a data structure definition of the object. The flag can be set by the second node device 804 (e.g., the indicator component 808) or another node device (e.g., a coordinator node device). For example, the flag in the data structure definition of the object can be changed by the indicator component 808 from a first state (e.g., an off state) to a second state (e.g., an on state). By changing from the first state to the second state, the first node device 802 (e.g., the analysis component 702) can determine another node device (e.g., the second node device 804) has marked the object for deletion. If there is no contention callback, no nodes are notified (not even the second node device). Instead, the first node device 802 just removes (or unlinks) the objects and no others know (or care as they were not waiting for a write lock).

The first node device 802 can include an identifier component 810 that can select one or more objects for removal from the cache. To select the object, the identifier component 810 can determine that access to the object has not occurred within a defined time period. In another example, to select the object, the identifier component 810 can receive (e.g., via the transmitter/receiver component 708) an implicit command to delete the object. In some implementations, other policies and/or rules can be utilized by the identifier component 810 to determine which objects should be marked for deletion.

As illustrated, the second node device 804 can include at least one transmitter/receiver component 812, at least one memory 814, at least one processor 816, and at least one data store 818. The at least one memory 814 can be operatively connected to the at least one processor 816. The at least one memory 814 can store executable instructions and/or computer executable components (e.g., the upgrade component 806, the indicator component 808, the at least one transmitter/receiver component 812, and so on) that, when executed by the at least one processor 816 can facilitate performance of operations. Further, the at least one processor 816 can be utilized to execute computer executable components (e.g., the upgrade component 806, the indicator component 808, the at least one transmitter/receiver component 812, and so on) stored in the at least one memory 814.

For example, the at least one memory 814 can store protocols associated with facilitating object lock upgrade and object selection in distributed file system as discussed herein. Further, the at least one memory 814 can facilitate action to control communication between the second node device 804, the first node device 802, and other node devices, one or more file storage systems, one or more devices, such that the second node device 804 can employ stored protocols and/or algorithms to achieve improved overall performance of distributed file systems as described herein.

The at least one processor 816 can facilitate respective analysis of information related to delete lock contention. The at least one processor 816 can be a processor dedicated to analyzing and/or generating information received, a processor that controls one or more components of the second node device 804, and/or a processor that both analyzes and generates information received and controls one or more components of the second node device 804.

The at least one transmitter/receiver component 812 can output the upgrade request, and/or the indictor, to the first node device 802 or to another device or another node. The at least one transmitter/receiver component 812 can be configured to transmit to, and/or receive data from, for example, log files, a defined entity, one or more other nodes, and/or other communication devices. Through the at least one transmitter/receiver component 812, the second node device 804 can concurrently transmit and receive data, can transmit and receive data at different times, or combinations thereof.

In addition, it is noted that the second node device 804 can include one or more of the components and/or functionality of the first node device 802. Further, the first node device 802 can include one or more of the components and/or functionality of the second node device 804.

Methods that can be implemented in accordance with the disclosed subject matter, will be better appreciated with reference to the flow charts provided herein. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

As used herein, the term "storage device," "first storage device," "second storage device," "storage cluster nodes," "storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 9:
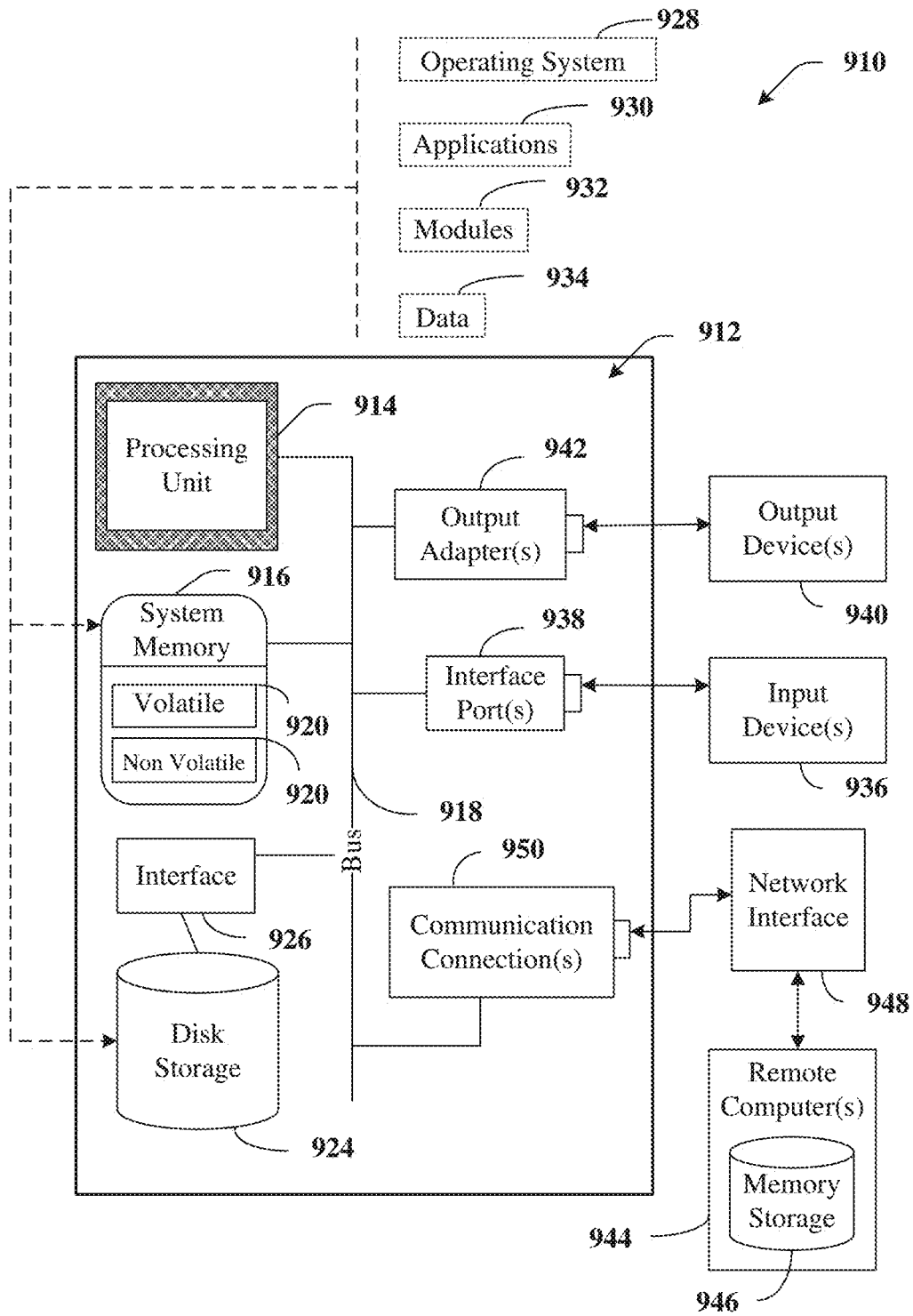
FIG. 9 illustrates an example, non-limiting, computing environment in which one or more embodiments described herein can be facilitated.

In order to provide a context for the various aspects of the disclosed subject matter, FIG. 9 as well as the following discussion are intended to provide a brief, general description of a suitable environment in which the various aspects of the disclosed subject matter can be implemented.

With reference to FIG. 9, an example environment 910 for implementing various aspects of the aforementioned subject matter comprises a computer 912. The computer 912 comprises a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 comprises volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can comprise read only memory (ROM), programmable ROM (PROM), electrically programmable ROM (EPROM), electrically erasable PROM (EEPROM), or flash memory. Volatile memory 920 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also comprises removable/non-removable, volatile/non-volatile computer storage media. FIG. 9 illustrates, for example a disk storage 924. Disk storage 924 comprises, but is not limited to, devices like a magnetic disk drive, floppy disk drive, tape drive, Jaz drive, Zip drive, LS-100 drive, flash memory card, or memory stick. In addition, disk storage 924 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software comprises an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 comprise, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 comprise, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically comprises many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 comprises, for exemplary purposes only, internal and external technologies such as, modems including regular telephone grade modems, cable modems and DSL modems, ISDN adapters, and Ethernet cards.

Figure 10:
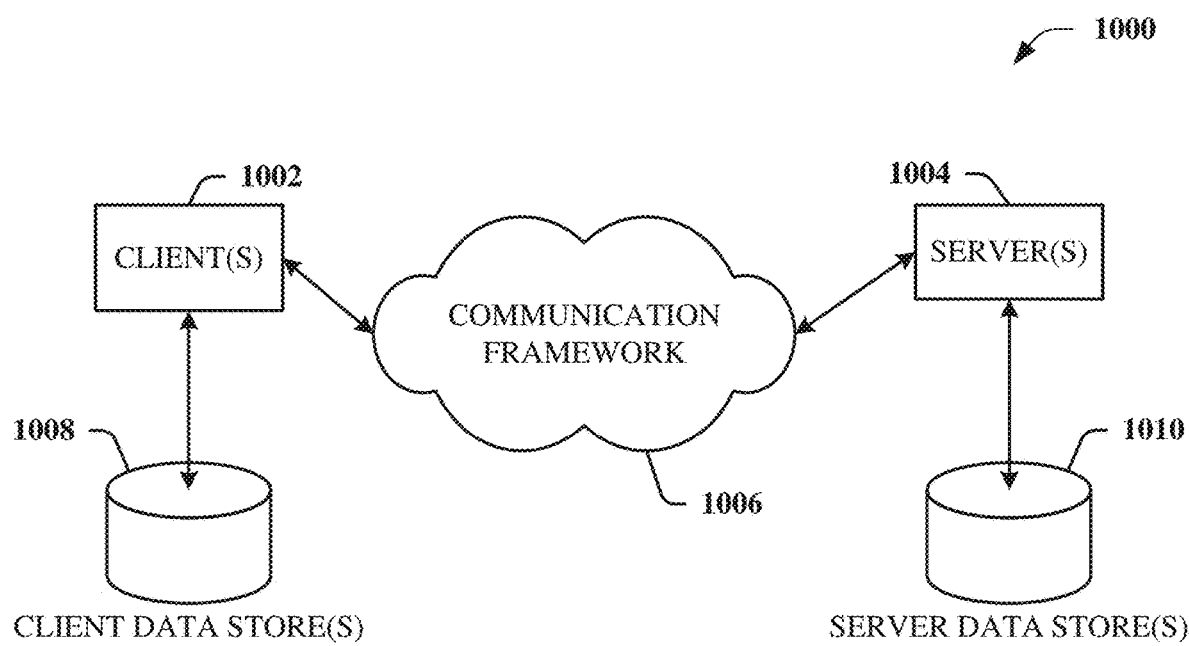
FIG. 10 illustrates an example, non-limiting, networking environment in which one or more embodiments described herein can be facilitated.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A first node device of a cluster of node devices, comprising:
a processor; and
a memory that stores executable instructions that, when executed by the processor, facilitate performance of operations, comprising:
determining whether a contention callback is assigned to an object scheduled to be removed from cache of the first node device;
based on the contention callback being assigned to the object, granting a write lock to a second node device of the cluster of node devices and removing from the cache a link to the object; and
based on the contention callback not being assigned to the object, releasing from the cache the link to the object without interactions with other node devices of the cluster of node devices, the other node devices including the second node device and being other than the first node device.

2. The first node device of claim 1, wherein the determining whether the contention callback is assigned to the object comprises determining whether a flag in a data structure definition of the object is in a first state that indicates the contention callback is assigned to the object, or in a second state that indicates the contention callback is not assigned to the object.

3. The first node device of claim 1, wherein the contention callback indicates that at least the second node device attempted to upgrade to an exclusive delete lock while the first node device held a shared lock for the object.

4. The first node device of claim 1, wherein the operations further comprise:
prior to the determining whether the contention callback is assigned to the object, identifying the object for removal from the cache, and wherein the identifying comprises determining access to the object has not occurred within a defined time period.

5. The first node device of claim 1, wherein the operations further comprise:
prior to the determining whether the contention callback is assigned to the object, identifying the object for removal from the cache, and wherein the identifying comprises receiving an implicit command to delete the object.

6. The first node device of claim 1, wherein the object is a file stored on a distributed file system.

7. The first node device of claim 1, wherein the cluster of node devices are nodes of a distributed file system.

8. A method, comprising:
determining, by a first node device comprising a processor and part of a group of node devices, that an object is to be unlinked at the first node device;
performing, by the first node device, an operation from a group of operations, the group of operations comprising:
based on a status of an indicator associated with the object being in a first state, performing, by the first node device, a first operation of the group of operations that grants a write lock to a second node device of the group of node devices and removes, from a cache of the first node device, a link to the object, and
based on the status of the indicator being in a second state, performing, by the first node device, a second operation of the group of operations that removes the link to the object from the cache of the first node device, wherein other nodes of the group of node devices, other than the first node device, are not notified of the second operation.

9. The method of claim 8, wherein the determining that the object is to be unlinked comprises receiving a command to delete the object.

10. The method of claim 8, wherein the indicator being in the first state is an indication that the second node device attempted to upgrade to an exclusive delete lock for the object while the first node device held a shared lock for the object.

11. The method of claim 10, wherein the performing the first operation comprises releasing the shared lock for the object.

12. The method of claim 8, wherein the performing the first operation comprises upgrading a lock state associated with the first node device for the object.

13. The method of claim 8, wherein the indicator is a flag associated with a data structure that defines the object.

14. The method of claim 13, wherein the data structure is an index node definition.

15. The method of claim 8, wherein the link to the object is an object descriptor.

16. The method of claim 8, wherein the object is a file stored on a distributed file system.

17. The method of claim 8, wherein the group of node devices are nodes of a distributed file system.

18. A machine-readable storage medium, comprising executable instructions that, when executed by a processor, facilitate performance of operations, comprising:
determining that a cache is to be released from a first node device of a group of node devices;
identifying an object for removal from the cache;
determining whether a contention callback is assigned to the object;
based on the contention callback being assigned to the object, granting a write lock to a second node device of the group of node devices and removing from the cache a link to the object; and
based on the contention callback not being assigned to the object, releasing from the cache the link to the object without interaction with other node devices of the group of node devices, other than the first node device and including the second node device.

19. The machine-readable storage medium of claim 18, wherein the determining whether the contention callback is assigned to the object comprises determining whether a flag in a data structure definition of the object is in a first state that indicates the contention callback is assigned to the object, or in a second state that indicates the contention callback is not assigned to the object.

20. The machine-readable storage medium of claim 18, wherein the identifying the object for the removal from the cache comprises determining access to the object has not occurred within a defined time period.

* * * * *